(12) United States Patent
Chen et al.

(10) Patent No.: US 7,196,464 B2
(45) Date of Patent: Mar. 27, 2007

(54) LIGHT EMITTING CELL AND METHOD FOR EMITTING LIGHT

(75) Inventors: Lai-Cheng Chen, Taipei (TW); Chun-Hui Tsai, Hsinchu (TW)

(73) Assignee: Delta Optoelectronics, Inc., Hsinchu (TW)

( * ) Notice: Subject to any disclaimer, the term of this patent is extended or adjusted under 35 U.S.C. 154(b) by 162 days.

(21) Appl. No.: 10/439,693

(22) Filed: May 16, 2003

(65) Prior Publication Data

US 2003/0205966 A1  Nov. 6, 2003

(51) Int. Cl.
*H01J 63/04* (2006.01)
(52) U.S. Cl. ............... 313/497; 313/495; 313/309; 313/293; 313/296; 313/297; 445/24; 445/25; 445/50; 445/51
(58) Field of Classification Search ........ 313/309–311, 313/293–304, 495–497; 445/24, 25, 50, 445/51
See application file for complete search history.

(56) References Cited

U.S. PATENT DOCUMENTS

| | | | | |
|---|---|---|---|---|
| 3,921,022 A | * | 11/1975 | Levine | 313/309 |
| 4,540,983 A | * | 9/1985 | Morimoto et al. | 345/75.1 |
| 5,528,103 A | * | 6/1996 | Spindt et al. | 313/497 |
| 5,650,690 A | * | 7/1997 | Haven | 313/422 |
| 5,834,900 A | | 11/1998 | Tanaka et al. | |
| 5,872,422 A | * | 2/1999 | Xu et al. | 313/311 |
| 5,877,594 A | * | 3/1999 | Miyano et al. | 315/169.1 |
| 5,920,151 A | * | 7/1999 | Barton et al. | 313/497 |
| 6,094,001 A | * | 7/2000 | Xie | 313/309 |
| 6,250,984 B1 | | 6/2001 | Jin et al. | |
| 6,283,812 B1 | | 9/2001 | Jin et al. | |
| 6,356,030 B2 | | 3/2002 | Itoh et al. | |
| 6,380,671 B1 | | 4/2002 | Lee | |
| 2001/0006232 A1 | * | 7/2001 | Choi et al. | 257/10 |

OTHER PUBLICATIONS

P.G. Collins and A. Zettl, AA Simple and Robust Electron Beam Source for Carbon Nanotubes@, Appl. Phys. Lett., vol. 69, No. 13, Sep. 23, 1996, pp. 1969-1971.
Q.H. Wang, T.D. Corrigan, J.Y. Dai, R.P.H. Chang, A.R. Krauss, AField Emission from Nanotube Bundle Emitters at Low Fields@, Appl. Phys. Lett, vol. 70, No. 24, Jun. 16, 1997, pp. 3308-3310.

* cited by examiner

*Primary Examiner*—Karabi Guharay
*Assistant Examiner*—Anthony Canning
(74) *Attorney, Agent, or Firm*—Greer, Burns & Crain, Ltd.

(57) ABSTRACT

A light-emitting cell, includes a light-emitting material which can emit light in response to a collision of an electron beam; an electron-emitting unit having a carbon nanotube as an electron source for releasing the electron beam and emitting the electron beam to ram against the light-emitting material; and a gate disposed above the carbon nanotube for controlling the electron beam emitting from the carbon nanotube whether to pass through the gate to ram against the light-emitting material at a specific address wherein the gate comprises a network conductor including a first metal layer for determining an x-coordinate of the address, a second metal layer for determining a y-coordinate of the address, and an extracting electrode placed between the carbon nanotube and the first metal layer for extracting the electron beam from the carbon nanotube.

26 Claims, 7 Drawing Sheets

LIGHT EMITTING CELL AND METHOD FOR EMITTING LIGHT

FIELD OF THE INVENTION

The present invention relates to a light emitting cell, and more particularly to a light emitting cell that utilizes carbon nanotubes for releasing an electron beam in order to ram against the phosphor.

BACKGROUND OF THE INVENTION

A high-brightness, power-saving display nowadays is often emerged in many occasions for displaying significant messages, for example, the scoreboard in a large stadium, electronic board in a public place, road sign on a freeway, and so on. Typically, a display is a combination of a great deal of light emitting cells. Currently, the light emitting cell for constituting a display falls roughly into five categories: Incandescent light bulb, small cathode ray tube, high voltage vacuum fluorescent display, small fluorescent lamp, and light-emitting diode.

The incandescent light bulb utilizes the fundamentals of heating the filament to emit light. Because the temperature of the filament which is made of tungsten has to be kept around 900° C. to 1500° C. while the incandescent light bulb is illuminating, the display that is constituted by incandescent light bulbs is very power-consuming and thus the energy efficiency is very low. In addition, because the incandescent light bulb can only emits yellowish white light, it will be quite difficult to be used to constitute a color display.

With respect to the cathode ray tube (CRT), the CRT utilizes electron beam to ram against the phosphor, therefore the luminescent efficiency of the CRT is very high. Theoretically, the energy efficiency of the CRT should be very high. Nevertheless, the electrons in a CRT are produced by heating a hot cathode formed by coating an oxide that is easy to release electrons, e.g. barium oxide, with the surface of metal. While the hot cathode is heating, the oxide is capable of releasing hot electrons. Because the electron gun that is used to produce electrons is a point electron source, the temperature and current of the electron gun have to be boosted in order to obtain a higher electron density. Thus for a light emitting cell requiring to possess high-brightness, the life of the electron gun will inevitably be reduced, and the power consumption will be increased accordingly. On the other hand, because the size of CRT is quite huge, it is not suitable for constituting a high-accuracy display. Moreover, the CRT display is very power-consuming. For example, the power consumption of a 25 m×40 m CRT display is rated at 2000 KW. Though the power consumption of small CRT is only ten percent of that of the incandescent light bulb, the point electron source will result in a low luminescent efficiency.

The high voltage vacuum fluorescent display (HVVFD) is similar to the CRT except that the point electron source is replaced with a line electron source. The line electron source is formed by coating an oxide that is easy to release electrons with a tungsten wire. Because the line electron source can emit numerous electrons to ram against the phosphor, the disadvantage of high power-consumption of the CRT display can be suppressed significantly. Besides, the HVVFD can integrate three original colors—red, green, and blue in a single cell, it is more suitable than CRT for constituting a color display with high resolution.

Nonetheless, though the HVVFD is much better than the CRT, the structure of HVVFD is quite complicated and it is uneasy to be manufactured. Moreover, it will consume a large quantity of power as heating the tungsten filament. For example, the power consumption of a display that is constituted by HVVFD with the size of 25 m×40 m is rated around 1000 kW.

The small fluorescent lamp that utilizes ultraviolet rays to excite the phosphor can also be used to constitute a display. Unfortunately, the colors of the fluorescent lamp today are quite few, and its size is difficult to be dropped below 1 line/mm. Accordingly, it is somewhat difficult to be used to constitute an accurate display.

Light-emitting diode (LED) has been widely employed on a large display today. Though the red, green, and blue LED have been developed thus far, the high-brightness red and blue LEDs are uneasy to be manufactured, and the luminescent efficiency of LED is not comparable to that of the fluorescent lamp. In addition to the disadvantage of low luminescent efficiency, the LED has a serious view angle problem and thus it will not be suitable to be used to constitute a large display.

To conclude, the conventional light emitting cell has the following disadvantages: (a) Low luminescent efficiency, (b) High energy consumption, and (c) Low resolution.

After analyzing the light emitting cells today, it can be found that the luminescent efficiency by using the electrons to ram against the phosphor is superior than that by using other light emitting techniques. Consequently, the small CRT has a better luminescent efficiency than incandescent light bulb, light-emitting diode, and so forth. However, the approach of producing electrons by heating is the major contribution to the power consumption in small CRT and HVVFD. If one is desired to reduce the power consumption, a cold cathode will be the best choice for producing electrons in a light emitting cell.

In 1995, Rinzler first discovered that a carbon nanotube, which is composed of carbon material, can release electrons in "A simple and robust electron beam source from carbon nanotubes" by Philips G. Collins and A. Zettl, Appl., Phys. Lett, 69(13), pp. 1969–1971, 1996. In 1997, Wang et al. discovered that carbon nanotube can release numerous electrons at a low electric field, such as 0.8 V/μm, in "Field emission from nanotube bundle emitters at low fields" by Q. H. Wang, T. D. Corrigan, J. Y. Dai, R. P. H. Chang, and A. R. Krauss, Appl., Phys. Lett, 70(24), pp. 3308–3310, 1997. Consequently, a high-brightness, power-saving, and high-accuracy light emitting cell can be brought out by combining a carbon nanotube at a low electric field and phosphor. The light emitting cell brought out thereby can be used to constitute a monochrome or a color display for displaying static texts and/or dynamic message picture, on an electronic board.

Figure 1A:
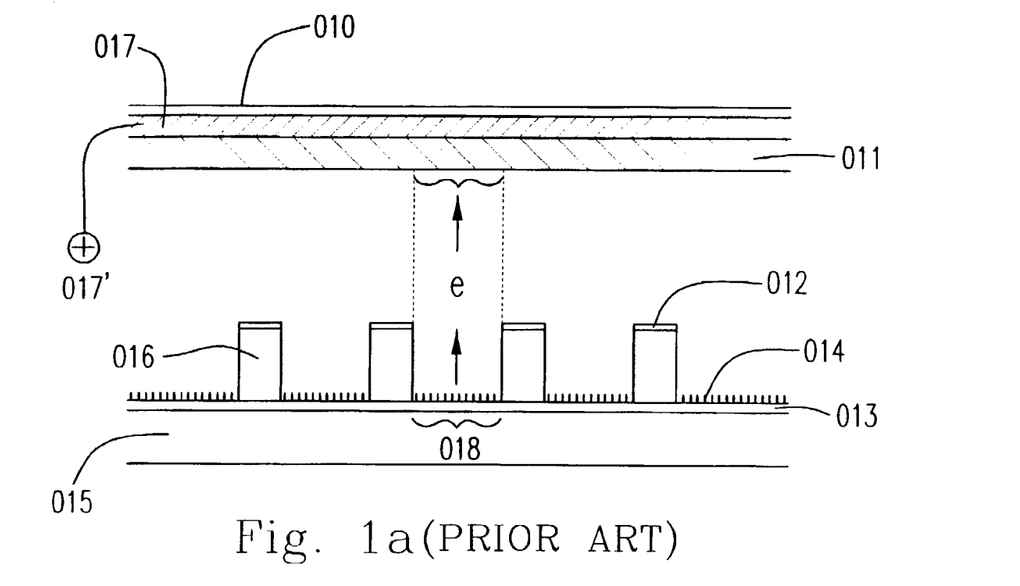
FIG. 1(a) is a sectional view showing the carbon nanotube field emitting display according to the prior art.

Please refer to the FIG. 1(a), it shows a well-known fiber (usually substituted by carbon nanotube) emission display. The display has a substrate 015 and a panel 010 opposite to each other. A collector electrode 017 is disposed on the panel 010. A light-emitting material 011 is coated on the collector electrode 017. A plurality of row metal lines 013 are disposed on the substrate 015 and plural carbon nanotubes 014 are grown on the row metal line 013 for being a electron source. Plural insulating layers 016 are disposed on the row metal lines 013 and a column metal line 012 is disposed on each of the insulating layer 016. Therefore, the conventional carbon nanotube field emission display is completely.

Figure 1B:
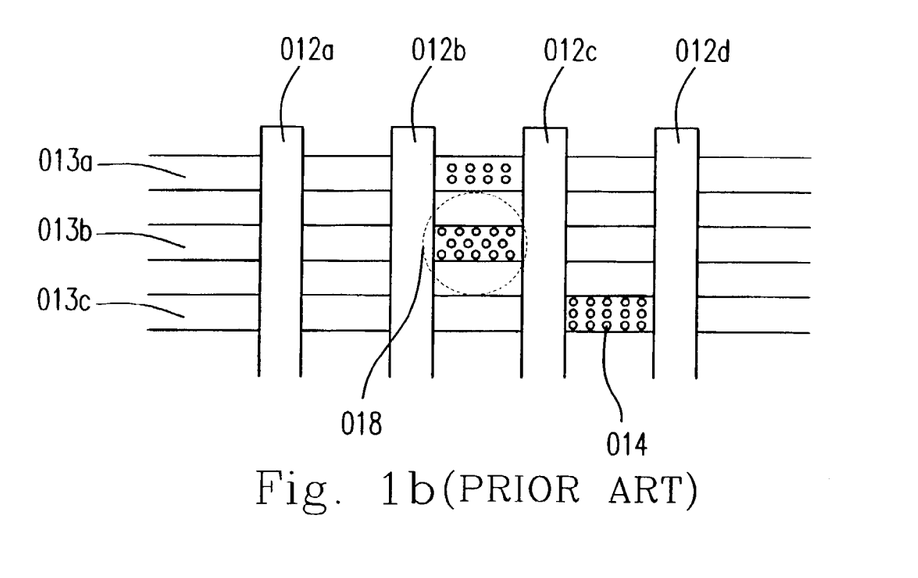
FIG. 1(b) is a upper view showing the structures of the row metal lines, column metal lines and the carbon nanotube according to the prior art.

Please refer to the FIG. 1(b), it is an upper view to show the structure of the column metal lines 012, row metal lines 013 and carbon nanotube 014. It shows that four column metal lines 012a, 012b, 012c, and 012d and three row metal lines 013a, 013b, and 013c are constructed as a network. In operation, please refer to the FIG. 1(a), the column metal lines 012 are biased positively with respect to the row metal lines 013 for extracting the electrons e from the carbon nanotubes 014. The collector electrode 017 is biased by a bias 017' for further extracting the electrons e to ram against the light-emitting material 011 to emit light. While the column metal line 012 is not biased, the electrons e will not escape from the carbon nanotube 014. Because the column metal lines 012 and the row metal lines 013 are constructed as a network, it is easy to control the address of the electrons e ramming against on the light-emitting material 011. For addressing electrons e on a specific address 018, the column metal lines 012b and 012c should be biased for extracting the electrons e escaping from the carbon nanotubes 014. Therefore, only the area 018' of the light-emitting material 011, which is over the address 018, can be rammed against by the electrons e to emit light and addressing work is achieved. However, when the prior art carbon nanotube field emission display operates, the address 018 needs not to release the electrons all the time. While the area 018' needs not to emit light, the column metal lines 012b and 012c will not be biased and the voltage potential thereof will be zero, which means the address 018 will not emit electrons e. After a while when the area 018' needs to emit light, the column metal lines 012b and 012c will be biased again for extracting the electrons e to escape from the carbon nanotubes 014. Therefore, the column metal lines 012b and 012c will turn on/off many times. However, it is harmful to frequently turn on/off a high voltage unit like the prior art carbon nanotube field emission display, since the frequent power on/off operation will shorten the lifetime of an electric unit. In addition, it is very difficult to drive the device at such high voltage, say 150 to 200 volt. Therefore, the problem of short-lifetime of the prior art carbon nanotube field emission display needs to be solved.

It is therefore the applicant tries to develop a light emitting cell by using a carbon nanotube as an electron source for producing electrons to ram against the light-emitting material (phosphor) for light emission. In the present invention, the carbon nanotubes can continuously release electrons because of the extraction of the extracting electrode. The gate can address the electron by controlling whether the electrons ram against the phosphor or not. Therefore, both the electrode of carbon nanotube and the extracting electrode are not intermittently charged and discharged, so the lifetime of the carbon nanotube field emission display, as the light emitting cell of the present invention, can become longer.

SUMMARY OF THE INVENTION

It is an object of the present invention to provide a high-brightness, low power-consumption, and high luminescent efficiency light emitting cell.

It is another object of the present invention to provide a method for emitting light.

For achieving the objects above, the present invention provides a light-emitting cell, comprising a light-emitting material which can emit light in response to a collision of an electron beam; an electron-emitting unit having a carbon nanotube as an electron source for releasing the electron beam and emitting the electron beam to ram against the light-emitting material; and a gate disposed above the carbon nanotube for controlling the electron beam emitting from the carbon nanotube whether to pass through the gate to ram against the light-emitting material at a specific address wherein the gate comprises a network conductor including a first metal layer for determining an x-coordinate of the address, a second metal layer for determining a y-coordinate of the address, and an extracting electrode placed between the carbon nanotube and the first metal layer for extracting the electron beam from the carbon nanotube.

The light emitting cell as set forth above, wherein the gate further comprises a first insulating layer placed between the first metal layer and the extracting electrode.

The light emitting cell as set forth above, wherein the gate further comprising a second insulating layer placed between the second metal layer and the first metal layer.

The light emitting cell as set forth in above, wherein the gate further comprises a third metal layer between the second metal layer and the first metal layer for focusing the electrode beam on a spot.

The light emitting cell as set forth above, wherein the gate further comprises a third insulating layer placed between the second metal layer and the third metal layer.

The light emitting cell as set forth above, wherein the light-emitting material is made of phosphor.

The light emitting cell as set forth above, further comprising a panel for attaching the light-emitting material thereto.

The light emitting cell as set forth above, wherein the electron-emitting unit includes a substrate having a conductive line layer formed thereon for forming the carbon nanotube on the conductive line layer.

The light emitting cell as set forth above, wherein the substrate is made of a material selected from a group of glass and ceramic.

The light emitting cell as set forth above, wherein the light-emitting cell further includes a spacer for separating the panel from the substrate.

The light emitting cell as set forth above, wherein the spacer is made of glass.

The light emitting cell as set forth above, further comprising a reflecting layer attached to the light-emitting material for enhancing reflection.

The light emitting cell as set forth above, wherein the metal layer is made of aluminum.

The light emitting cell as set forth above, further comprising a black matrix disposed adjacent to the light-emitting material for enhancing contrast.

The light emitting cell as set forth above, further comprising a reflecting layer attached to the light-emitting material and the black matrix for enhancing reflection.

The light emitting cell as set forth above, wherein the metal layer is made of aluminum.

The light emitting cell as set forth above, wherein the electron beam is emitted by applying an electric field to the electron beam to accelerate the electron beam.

The light emitting cell as set forth above, wherein the electric field has an intensity of 0.8 V/μm.

The light emitting cell as set forth above, wherein the light-emitting material emits light selected from a group comprising red, green and blue.

According to above objects, the present invention provides another light-emitting cell, comprising a light-emitting material which can emit light in response to a collision of an electron beam; an electron-emitting unit further having a carbon nanotube as an electron source; and an extracting electrode disposed adjacent the carbon nanotube for controlling the electron beam emitting from the carbon nanotube and then the electron beam flowing toward the light-emitting material; and a gate formed above the carbon nanotube and the extracting electrode for controlling the electron beam from the carbon nanotube whether to pass through the gate to ram against the light-emitting material at a specific address wherein the gate comprises a network conductor including a first metal layer for determining an x-coordinate of the address, and a second metal layer for determining a y-coordinate of the address.

Preferably, the gate further includes a second insulating layer placed between said first metal layer and said second metal layer.

Preferably, the gate further comprises a third metal layer placed between the second metal layer and the light-emitting material for focusing the electrode beam.

Preferably, the gate further includes a third insulating layer placed between the second metal layer and the third metal layer.

Preferably, the light-emitting material is made of phosphor.

Preferably, the light emitting cell further comprising a panel for attaching the light-emitting material thereto.

Preferably, the electron-emitting unit includes a substrate having a conductive line layer formed thereon for forming the carbon nanotube on the conductive line layer.

Preferably, the substrate is made of a material selected from a group of glass and ceramic.

Preferably, the light-emitting cell further includes a spacer for separating the panel from the substrate.

Preferably, the spacer is made of glass.

Preferably, the light emitting cell further includes a reflecting layer attached to the light-emitting material for enhancing reflection.

Preferably, the metal layer is made of aluminum.

Preferably, the light emitting cell further includes a black matrix disposed adjacent to the light-emitting material for enhancing contrast.

Preferably, the light emitting cell further includes a reflecting layer attached to the light-emitting material and the black matrix for enhancing reflection.

Preferably, the metal layer is made of aluminum.

Preferably, the electron beam is emitted by applying an electric field to the electron beam to accelerate the electron beam.

Preferably, the electric field has an intensity of 0.8 V/μm.

According to above objects, the present invention further provides yet another light-emitting cell, comprising a panel attached by a light-emitting material thereon, and the light-emitting material divided as plural color blocks by plural black matrix, and a reflecting material attached to the light-emitting material and the black matrix; the light-emitting material can emit light in response to a collision of an electron beam; a substrate having a conductive layer formed thereon for forming a carbon nanotube on the conductive layer, the carbon nanotube as an electron source for releasing the electron beam to ram against the light-emitting material; a gate disposed between the carbon nanotube and the light-emitting material for controlling the electron beam emitting from the carbon nanotube whether to pass through the gate to ram against the light-emitting material at a specific address wherein the gate comprises a network conductor including a first metal layer for determining an x-coordinate of the address, a second metal layer for determining a y-coordinate of the address, a third metal layer for focusing the electron beam, and an extracting electrode disposed between the carbon nanotube and the first metal layer for extracting the electron beam from the carbon nanotube.

In accordance with the present invention, the panel is separated from the substrate by a spacer placed therebetween.

In accordance with the present invention, the spacer is made by a selection from ceramics and glass.

In accordance with the present invention, the gate has a first insulating layer attached between the extracting electrode and the first metal layer, a second insulating layer attached between the first metal layer and the second metal layer, and a third insulating layer attached between the second metal layer and the third metal layer.

In accordance with the present invention, the reflecting material is made by aluminum.

In accordance with the present invention, the color blocks are individually selected from red, green and blue.

In accordance with the present invention, the first, second and third metal layers are individually constructed by a plurality of parallel metal plates having plural apertures thereon.

In accordance with the present invention, the first, second and third metal layers are metal wires.

In accordance with the present invention, the extracting electrode is a metal plate having plural apertures thereon.

For achieving above-mentioned objects, the present invention introduces a light-emitting cell, comprising a panel attached by a light-emitting material thereon, and the light-emitting material divided as plural color blocks by plural black matrix, and a reflecting material attached to the light-emitting material and the black matrix; the light-emitting material can emit light in response to a collision of an electron beam; a substrate further having a conductive line layer formed thereon for forming a carbon nanotube on the conductive line layer, the carbon nanotube as an electron source for releasing the electron beam to ram against the light-emitting material; and an extracting electrode disposed on a dielectric layer formed on the substrate, and adjacent the carbon nanotube for controlling the electron beam emitting from the carbon nanotube and the electron beam flowing toward the light-emitting material; and a gate formed above the carbon nanotube and the extracting electrode for controlling the electron beam from the carbon nanotube whether to pass through the gate to ram against the light-emitting material at a specific address wherein the gate comprises a network conductor including a first metal layer for determining an x-coordinate of the address, a second metal layer for determining a y-coordinate of the address, and a third metal layer for focusing the electron beam The light emitting cell as set forth above, wherein said panel is separated from said substrate by a spacer be placing therebetween.

Certainly, the spacer is made by a selection from ceramics and glass.

Certainly, the gate has a second insulating layer attached between said first metal layer and said second metal layer, and a third insulating layer attached between said second metal layer and said third metal layer.

Certainly, the reflecting material is made by aluminum.

Certainly, the color blocks are individually selected from red, green and blue.

Certainly, the first, second and third metal layers are individually constructed by a plurality of parallel metal plates having plural apertures thereon.

Certainly, the first, second and third metal layers are metal wires.

Certainly, the light is enclosed in a vacuum environment.

According to the objects of the present invention, the present invention provides a method for emitting light, comprising steps of providing a light-emitting material which can emit light in response to a collision of an electron beam; providing a carbon nanotube as an electron source for releasing the electron beam; providing an extracting electrode adjacent to the carbon nanotube for continuously extracting the electron beam from the carbon nanotube; and providing a gate above the carbon nanotube layer for controlling the electron beam whether to pass through the gate to ram against the light-emitting material on a specific address thereon wherein the gate provided a first metal layer for determining an x-coordinate of the address, and a second metal layer for determining a y-coordinate of the address.

Preferably, the first metal layer is constructed by a plurality of first conductive wires, and the second metal layer is constructed by a plurality of second conductive wires.

Preferably, the first metal layer is constructed by a plurality of first longitudinal metal plates, and the second metal layer is constructed by a plurality of second longitudinal metal plates, the first longitudinal metal plates have plural first apertures thereon for the electron beam passing therethrough and the second longitudinal metal plates have plural second apertures thereon for the electron beam passing therethrough, and the first apertures are aligning to the second apertures.

Preferably, the extracting electrode is placed above the carbon nanotube and exempted from the first metal layer by a first insulating layer, the extracting electrode has plural passing apertures for the electron beam passing therethrough.

Preferably, the method further includes a step is to providing a second insulating layer between the first metal layer and second metal layer for attached by the first metal layer and the second metal layer.

Preferably, the method further includes a step is to providing a third metal layer on the gate for focusing the electron beam as a spot on the address.

Preferably, the method further includes a step is to providing a third insulating layer between the second metal layer and the third metal layer for being attached by the second metal layer and the third metal layer.

Preferably, the third metal layer has plural focusing apertures for the electron beam passing therethrough and focused therein.

Preferably, the electron beam is emitted by applying an electric field to said electron beam to accelerate said electron beam.

Preferably, the electric field has an intensity of 0.8 V/µm.

Preferably, the carbon nanotube is formed on a conductive layer forming on a substrate, the extracting electrode is formed above said conductive layer and exempted therefrom by a dielectric material.

DETAILED DESCRIPTION OF THE PREFERRED EMBODIMENT

Figure 2A:
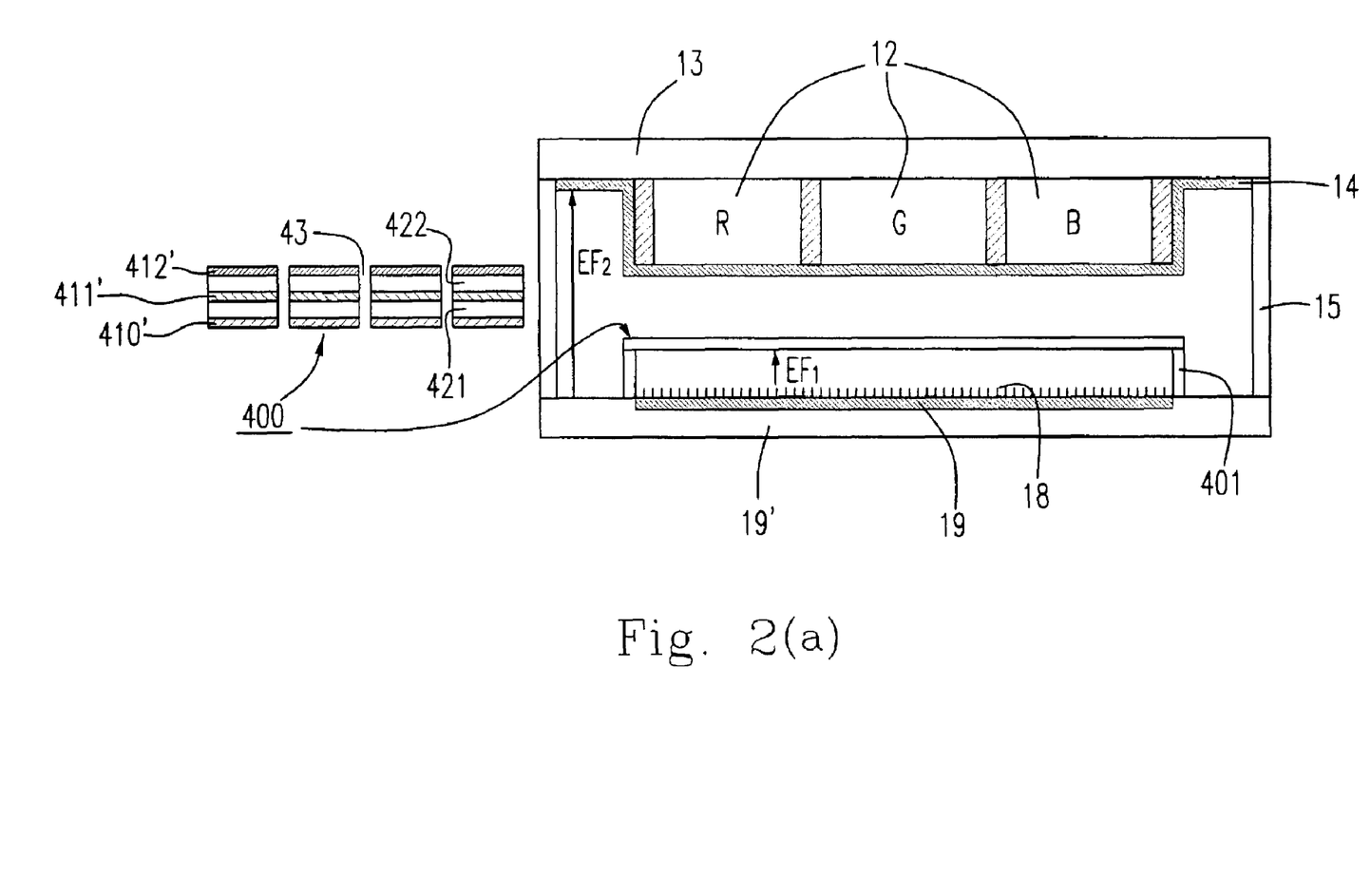
FIG. 2(a) is a sectional view showing the first embodiment according to the present invention.

The present invention will now described more specifically with reference to the following embodiments. Please refer to FIG. 2(a). FIG. 2(a) is a sectional view showing the first embodiment according to the present invention. A substrate 19' having a conductive layer 19 thereon is disposed opposite to the panel 13 having a light-emitting material 12 coated thereon. The light-emitting material 12 can be only one phosphor for emitting white light. However, for emitting colorful light, the light-emitting material 12 can be divided into three piles and each pile of red, green, and blue material is attached to the panel 13. For enhancing the contrast effect, the black matrix (BM) 11 is disposed adjacent to each pile of the light-emitting material 12. The aluminum layer 14 is attached to the surface of the black matrix 11 and the light-emitting material 12 for enhancing the reflection effect. The substrate 19' is made of glass or ceramic. A plurality of carbon nanotube 18 are formed on the substrate 19'. A gate 400 is formed between the carbon nanotube 18, and the panel 13 extracts the electron from the carbon nanotube 18. The gate 400 is made as a network including a extracting electrode 410, a first metal layer 411', and a second metal layer 412'. The extracting electrode 410 is used for continuously extracting the electron from the carbon nanotube 18. And then the electron escapes from the carbon nanotube 18 and flows to the gate 400. The gate 400 has plural apertures 43 penetrating the extracting electrode 410, the first metal layer 411' and the second metal layer 412' thoroughly. And the first metal layer 411' and the second metal layer 412' control whether the electrons pass through the apertures 43 or not. The apertures 43 maybe like the net eyes of a ordinary fabric network so the apertures 43 are disposed regularly and a specific address can be determined precisely and easily. The address is where the electron hits on. Therefore, the first metal layer 411' determines the x-coordinate of the address and the second metal layer 412' determines the y-coordinate of the address. While the x and y coordinates are determined, the address is determined. The panel 13 and the substrate 19' are separated by a spacer 15, which can be made of glass or ceramic or any other insulating material. The stand 401 supports the gate 400 raising from the carbon nanotube 18 and makes the gate 400 suspending over the carbon nanotube 18. Similarly, like the spacer 15, the stand 401 can be made of glass or ceramic or any other insulating material. Normally, the extracting electrode 410 is disposed very closely to the carbon nanotube 18 for more easily extracting the electron escaping from the carbon nanotube 18. And the first metal layer 411' and the second metal layer 412' are disposed between the extracting electrode 410 and the panel 13 for determining the address of the electron extracted by the extracting electrode 410. The whole light-emitting cell is enclosed in a vacuum environment.

In the light of the feature of carbon nanotube 18, as long as a low electric field EF1, e.g. 0.8 V/μm, is applied between the extracting electrode 410 and the carbon nanotube 18, numerous electrons can be released from the carbon nanotube 18. While a high electric field EF2 with a high voltage, e.g. 5000 V, is applied to the panel 13 such that the panel 13 acts as an anode, the released electrons are accelerated to penetrate through the apertures 43 of the network gate 400 and rammed against the phosphor 12. The conductive line layer 19 can be taken as a control switch for controlling the carbon nanotubes 18. The carbon nanotubes 18 can continuously emits electrons due to the applied voltage of the low electric field EF1. Hence, a large color display can be brought out by combining a great deal of light emitting cells of the present invention. The panel 13 itself can be made of transparent conductive material (for example, indium tin oxide, ITO) or be coated with a transparent conductive layer between the panel 13. The phosphor 12 and the high voltage is applied to the transparent conductive layer for providing the high electric field EF2 in order to pull the electron flow to the panel 13 and then to make the electron hit on the phosphor 12. When the phosphor 12 absorbs the electron, the phosphor 12 emits light respectively.

As discussed above, the carbon nanotube 18 can release numerous electrons at a low electric field EF1, the difficulties encountered by the CRT and HVVFD can be significantly overcome. In the mean time, the well-known three original colors—red, green, blue, can be integrated in a single light emitting cell, such as the three piles of phosphor 12 in the FIG. 2(a). Consequently, the light emitting cell can be applied to constitute a power-saving, full-color electronic board. Furthermore, because the conductive layer 19 and the extracting electrode 410 are continuously supplied with a low electric field EF1, the electron are continuously escaping from the carbon nanotube 18 and flowing toward the first metal layer 411' and second metal layer 412'. And the electron will flow to the panel 13 because of the high electric field EF2. However, before the electron hits on the phosphor 12, the electron must pass through the apertures 43 first, in which the apertures 43 are formed on the first metal layer 411' and the second metal layer 412'. Therefore, the first metal layer 411' and the second metal layer 412' control whether or not the electron passes through the apertures 43, even though the extracting electrode 410 is continuously extracting the electrons from the carbon nanotubes 18. In other words, the first metal layer 411' and the second metal layer 412' control the electron passing through the specific apertures 43 so as to control the addressing of the electrons hitting on the phosphor 12. The extracting electrode 410 is just used for continuously extracting the electrons escaping from all of the carbon nanotubes 18.

Please again refer to the FIG. 2(a), the gate 400 comprises a extracting electrode 410, the first metal layer 411' and the second metal layer 42'. The extracting electrode 410 is disposed as closely as possible to the carbon nanotubes 18 so that the extracting voltage (e.g. low electric field EF1) can be reduced (e.g. 0.8 V/μm). And the first metal layer 411' and the second metal layer 412' constructed as a network are disposed between the panel 13 and the extracting electrode 410. Furthermore, in order to prevent the short-cut of the electric power, a first insulating layer 421 is disposed between the extracting electrode 410 and the first metal layer 411'. Also, a second insulating layer 422 is disposed between the first metal layer 411' and the second metal layer 412'. Of course, the apertures 43 penetrates the first and second insulating layer 421, 422 for the electron passing therethrough.

Figure 2B:
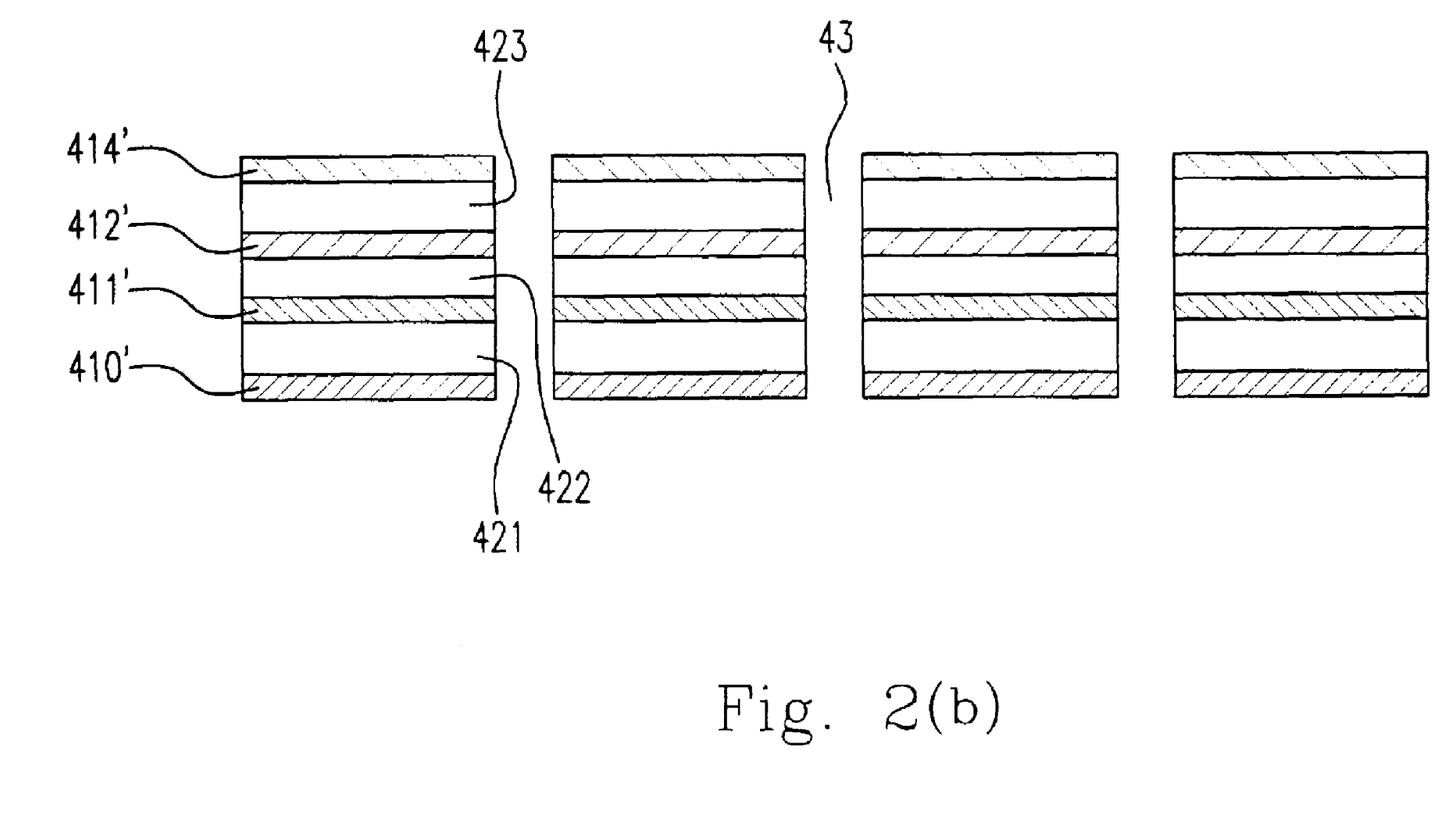
FIG. 2(b) is a sectional view showing the gate structure which has a third metal layer and a third insulating layer according to the first embodiment of the present invention.

Please refer to the FIG. 2(b) which is a sectional view showing the gate structure 400, which further has a third metal layer 414' and a third insulating layer 423 compared to the first embodiment of the present invention. For more precisely addressing the electron to ram against on the exact address of the phosphor 12, a third metal layer 414' is introduced into the present invention as a electrical-magnetic lens for focusing the electron beam which is formed by the electrons. For the purpose of focusing, the third metal layer 414' is disposed between the second metal layer 412' and the panel 13. Because the electron beam will scatter after passing through the apertures 43, the third metal layer 414' can focus the electro beam before they hit on the phosphor 12. In the FIG. 2(b), the third metal layer 414' is built within the gate 400. In order to prevent short-cut the short circuit of the electric power, a third insulating layer 423 is formed between the third metal layer 414 and the second metal layer 412'.

Figure 3A:
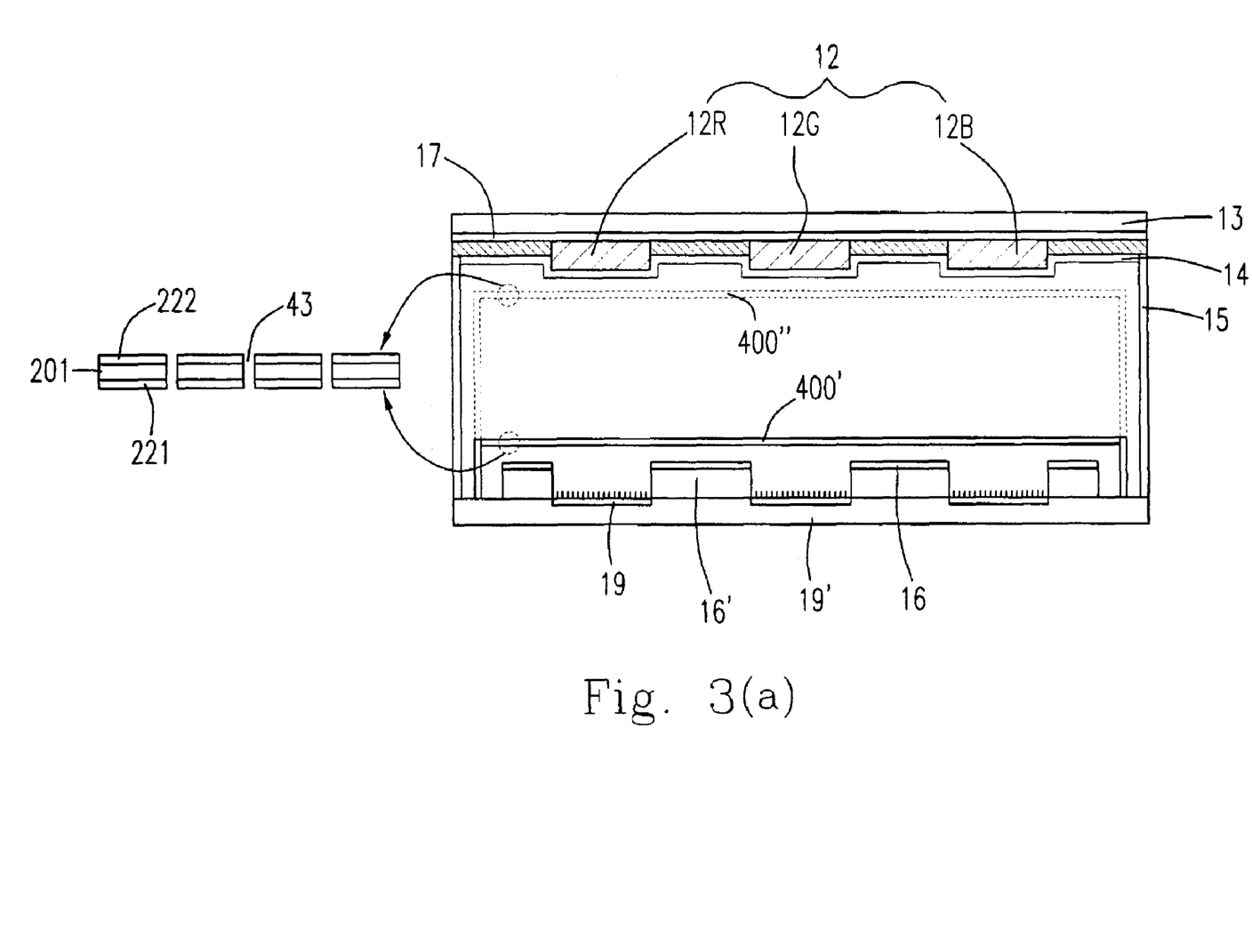
FIG. 3(a) is a sectional view showing the second embodiment according to the present invention.

Please refer to the FIG. 3(a), which is a sectional view showing the second embodiment according to the present invention. The panel 13 is parallelly disposed opposite to the substrate 19'. The a transparent collector electrode 17 is coated on the panel 13 for generating an electric field between the panel 13 and the substrate 19'. Three piles of phosphors 12R, 12G and 12B are attached on the collector electrode 17 for being rammed by the electron beam and then emitting visible light. In substrate 19', a conductive layer 19 is disposed thereon and plural carbon nanotubes 18 are grown on the conductive layer 19 as the electron source. An extracting electrode 16, which is disposed adjacent to the carbon nanotubes 18, is used for continuously extracting the electron from the carbon nanotubes 18. While the electrons are extracted away from the carbon nanotubes 18, the electrons will further flow forward and ram against the phosphor 12 since the electric field is made between the collector electrode 17 and the substrate 19'. However, because the electrons, from the carbon nanotubes 18, are continuously extracted by the extracting electrode 16 and the extracting electrode 16 does not take the responsibility of addressing, this embodiment of the present invention provides a gate 400' for addressing the electron to ram against on the phosphor 12. The reason of "the extracting electrode 16 do not take the responsibility of addressing but continuously extracting electron from the carbon nanotube 18" is that the frequent power on/off of a high voltage electric unit like the prior art of FIG. 1 will shorten the lifetime itself. Therefore, in the present invention, the carbon nanotube 18 is chosen to emit the electron continuously rather than intermittently emit the electron like the prior art in FIG. 1. And the gate 400' addresses the specific address which are rammed against by the electron. Although the gate 400' is turned on/off intermittently, the gate 400' only controls whether the electron passes therethrough or not, so that the voltage thereon is not so high as that voltage of the extracting electrode 16. Therefore, the intermittently turning on/off of the gate 400' will not shorten the lifetime itself. The gate 400' has a first metal layer 221 for addressing the x-coordinate of a specific address, and a second metal layer 222 for addressing the y-coordinate of the specific address. Furthermore, for preventing a short circuit between the first metal layer 221 and the second metal layer 222, a second insulating layer 201 is provided therebetween. When the electrons are extracted by the extracting electrode 16 and then escape from the carbon nanotube 18, the electrons become a electron beam because of the electric field applied on the unit. When the electron beam flows toward the phosphor 12 before hitting on the phosphor 12, the electron beam will meet the gate 400' first. While a specific x-coordinate and y-coordinate of a address is determined, the electron beam will only pass through the specific address on the gate 400' and then the electron beam will ram against on a specific address of the phosphor 12 according to the address on the gate 400'.

Figure 3B:
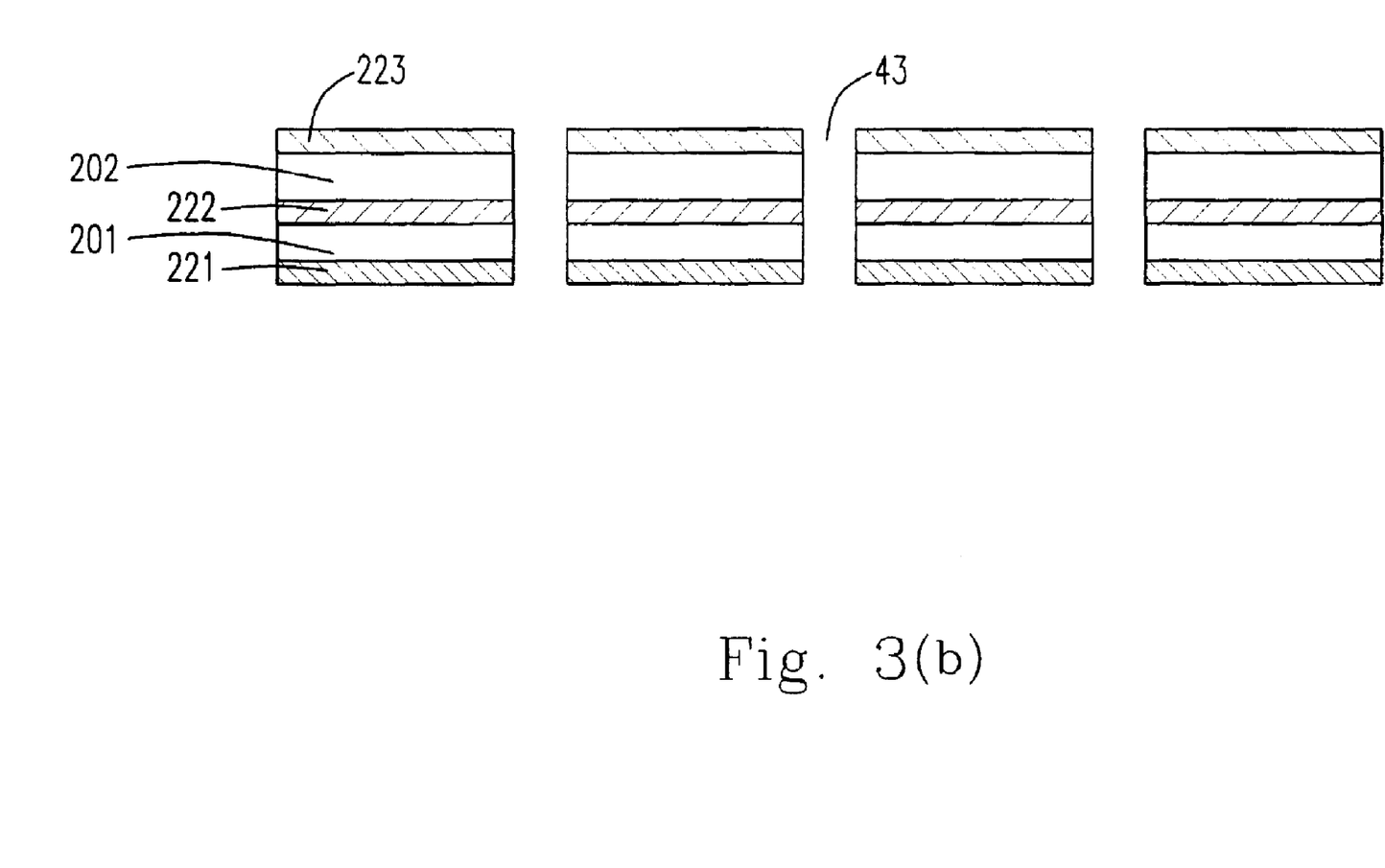
FIG. 3(b) is a sectional view showing the gate structure which has a third metal layer and a third insulating layer according to the second embodiment of the present invention.

Please refer to the FIG. 3(*b*), which is a sectional view showing the gate structure, which further has a third metal layer 223 and a third insulating layer 202 according to the second embodiment of the present invention. The third metal layer 223 is used for focusing the electron beam passing through the aperture 43 so as to prevent the electron beam form scattering after passing through the aperture 43. However, there is another way to prevent the electron beam from scattering. Please refer to the FIG. 3(*a*) again, another gate 400" is disposed near to the phosphor 12. Therefore, after the electron beam passes through the aperture 43, the electron beam has no time to scatter and suddenly hit on the phosphor 12. So, by the usage of the gate 400", the third metal layer 223 for focusing is not necessary. In practice, the distance between the gate 400" and the phosphor 12 is much smaller than the half distance between the phosphor 12 and the carbon nanotube 18. So, the extracting electrode 16 can be disposed more closely to the carbon nanotube 18, and the gate 400" can be disposed more closely to the phosphor 12. In such a way, the third metal layer for focusing the electron beam does no need to be introduced in the embodiment having the gate 400".

Figure 4:
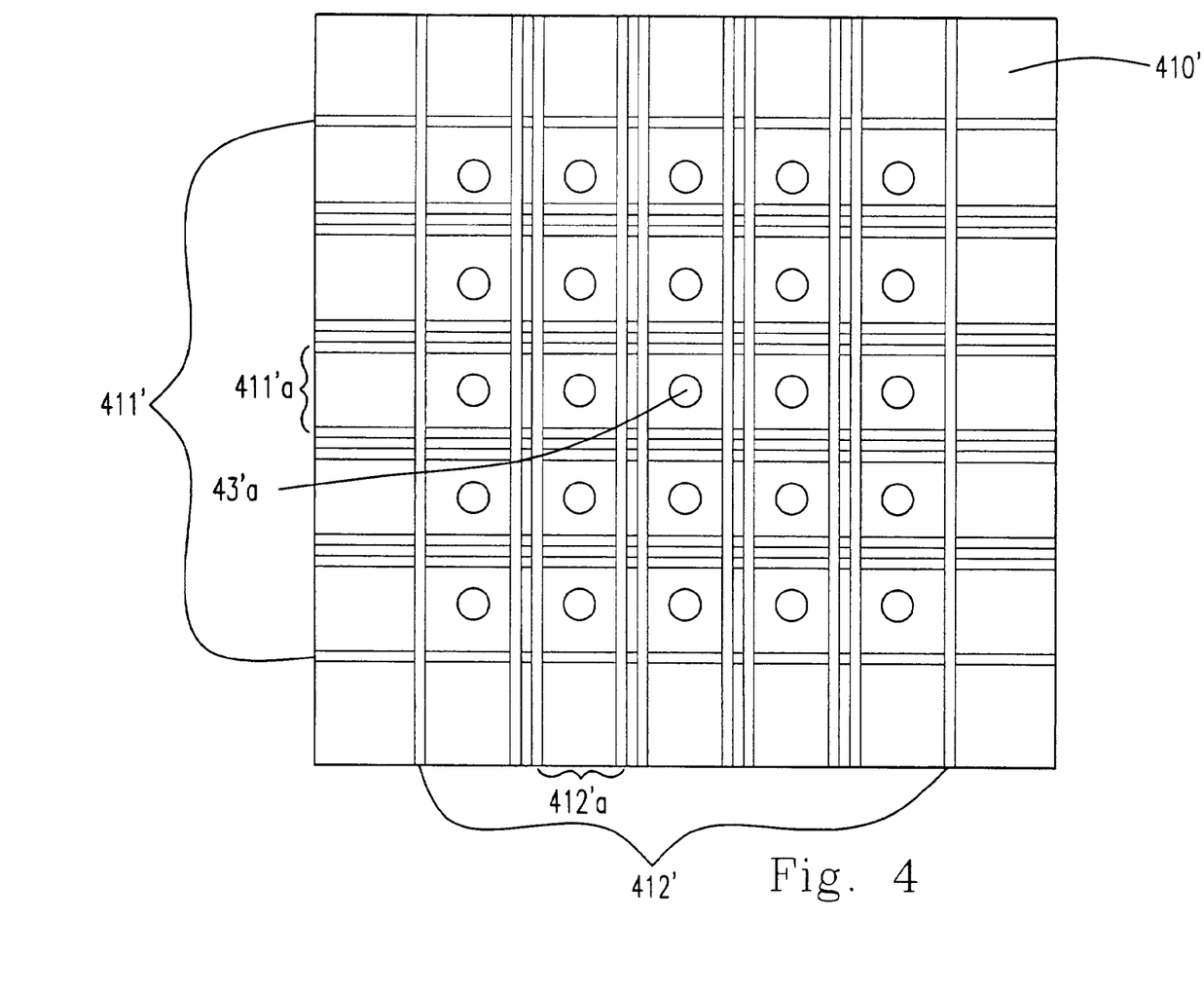
FIG. 4. is a top view showing a primary sub-embodiment applied on the gate structure according to the first embodiment of the present invention.

Please refer to the FIG. 4, which is a top view showing a primary sub-embodiment applied on the gate structure the first embodiment of the present invention. This primary sub-embodiment can be operated together with the embodiment of the gate 400 in the FIG. 2(*a*). The extracting electrode 410' is made of conductive material and has plural apertures 43'*a* disposed thereon for the electron beam passing therethrough. Above the extracting electrode 410', a first metal layer 411' is disposed for determining the y-coordinate of a specific address. Above the first metal layer 411', a second metal layer 412' is disposed for determining the x-coordinate of the specific address. The metal layers 411' and 412' has plural pairs of conductive lines. For addressing the electron beam passing through the aperture 43'*a*, the first pair 411'*a* and the second pair 412'*a* are conducted by electric power, therefore, the electron beam toward to the aperture 43' can pass therethrough. Furthermore, according to the FIG. 2(*b*), a third metal layer 414 (not shown in the FIG. 4) can be disposed above the second metal layer 412', so as to focus the electron beam passing through the aperture 43'*a*.

In addition, in the embodiment shown in the FIG. 3(*a*), although the extracting electrode 16 is disposed on the substrate 19', the gate 400' can still achieve the object of addressing the electron beam through the first metal layer 411' and the second metal layer 412' of the FIG. 4. On the contrary, the third metal layer 223 (not shown in the FIG. 4) of the FIG. 3(*b*) can be disposed above the second metal layer 412' of the FIG. 4 for focusing the electrode beam passing through the aperture 43'*a*.

Figure 5:
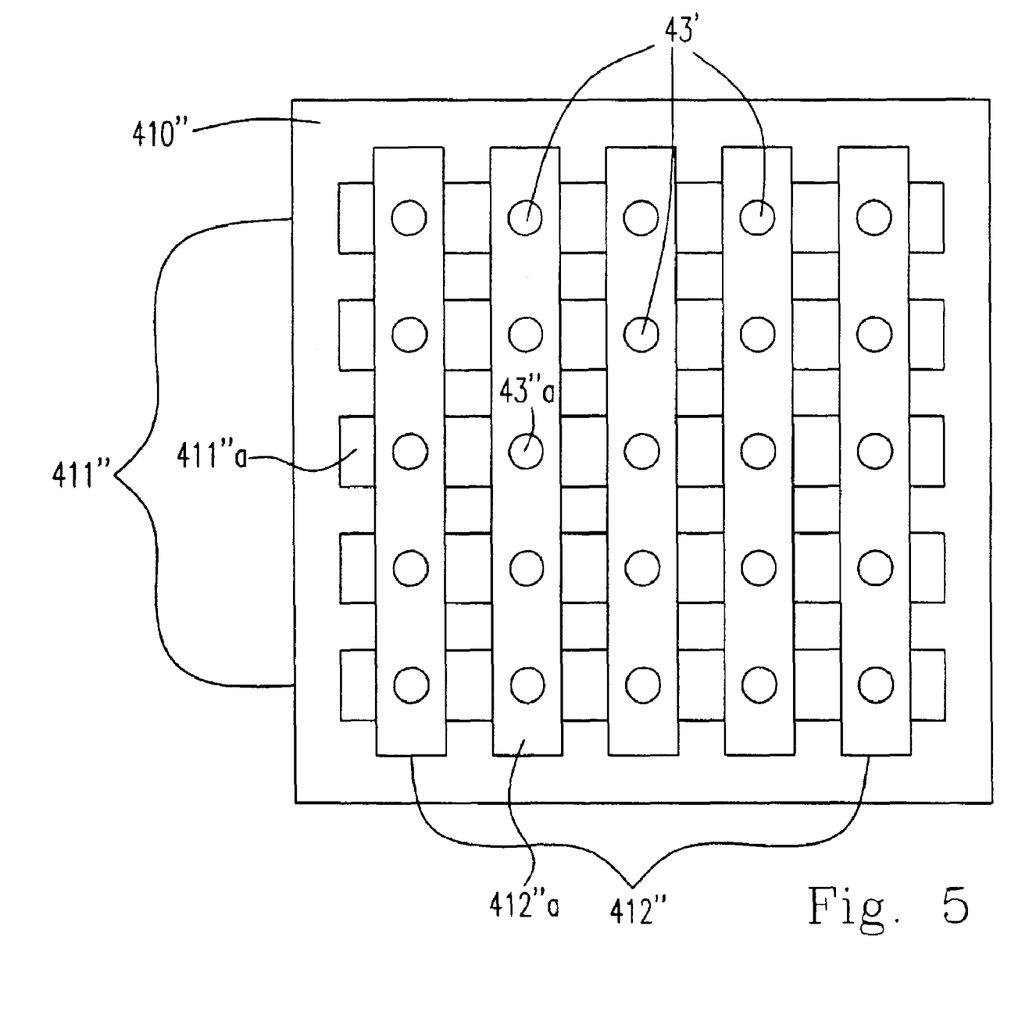
FIG. 5 is a top view showing a secondary sub-embodiment applied on the gate structure of the first embodiment according to the present invention.

Please refer to the FIG. 5, which is a top view showing a secondary sub-embodiment applied on the gate structure of the first embodiment of the present invention. This secondary sub-embodiment can be operated together with the embodiment of the gate 400 in the FIG. 2(*a*). The extracting electrode 410' is made of conductive material and has plural apertures 43'*a* for the electron beam passing therethrough. Above the extracting electrode 410', a first metal layer 411" is disposed for determining the y-coordinate of a specific address. Above the first metal layer 411", a second metal layer 412" is disposed for determining the x-coordinate of the specific address. The first and second metal layers 411" and 412" include plural longitudinal plates and each of the longitudinal plate has one row of passing aperture 43"*a* for the electron beam passing therethrough. For addressing the electron beam passing through a specific passing aperture 43"*a*, a first plate 411"*a* and a second plate 412"*a* are conducted by electric power, therefore, only the electron beam toward to the passing aperture 43"*a* can pass therethrough. Furthermore, according to the FIG. 2(*b*), a third metal layer 414 (not shown in the FIG. 5) can be disposed above the second metal layer 412", so as to focus the electron beam passing through the passing aperture 43".

In addition, in the embodiment shown in the FIG. 3(*a*), although the extracting electrode 16 thereof is disposed on the substrate 19', the gate 400' can still achieve the object of addressing the electron beam through the first metal layer 411" and the second metal layer 412" of the FIG. 4. On the contrary, the third metal layer 223 (not shown in the FIG. 4) of the FIG. 3(*b*) can be disposed above the second metal layer 412' of the FIG. 4 for focusing the electrode beam passed through the passing aperture 43".

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A light-emitting cell, comprising:
   a light-emitting material which can emit light in response to a collision of an electron beam;
   an electron-emitting unit having a carbon nanotube as an electron source for releasing said electron beam and emitting said electron beam to ram against said light-emitting material; and
   a gate disposed above said carbon nanotube for controlling said electron beam emitting from said carbon nanotube whether to pass through said gate to ram against said light-emitting material at a specific address;
   wherein said gate comprises a network conductor including a first metal layer of longitudinal conductors for determining an x-coordinate of said address, a second metal layer of latitudinal conductors for determining a y-coordinate of said address, and an extracting electrode placed between said carbon nanotube and said first metal layer for extracting said electron beam from said carbon nanotube, and wherein said gate further comprises a second insulating layer placed between said second metal layer and said first metal layer.

2. The light emitting cell as set forth in claim 1, wherein said gate further comprises a first insulating layer placed between said first metal layer and said extracting electrode.

3. The light emitting cell as set forth in claim 1, wherein said gate further comprises a third metal layer between said second metal layer and said light-emitting material for focusing said electrode beam on a spot.

4. The light emitting cell as set forth in claim 3, wherein said gate further comprises a third insulating layer placed between said second metal layer and said third metal layer.

5. The light emitting cell as set forth in claim 1, wherein said light-emitting material is made of phosphor.

6. The light emitting cell as set forth in claim 1, further comprising a panel for attaching said light-emitting material thereto.

7. The light emitting cell as set forth in claim 1, wherein said electron-emitting unit includes a substrate having a conductive line layer formed thereon for forming said carbon nanotube on said conductive line layer.

8. The light emitting cell as set forth in claim 7, wherein said substrate is made of a material selected from a group of glass and ceramic.

9. The light emitting cell as set forth in claim 7, wherein said light-emitting cell further includes a spacer for separating said panel from said substrate.

10. The light emitting cell as set forth in claim 9, wherein said spacer is made of glass.

11. The light emitting cell as set forth in claim 1, further comprising a reflecting layer attached to said light-emitting material for enhancing reflection.

12. The light emitting cell as set forth in claim 11, wherein said reflecting layer is made of aluminum.

13. The light emitting cell as set forth in claim 1, further comprising a black matrix disposed adjacent to said light-emitting material for enhancing contrast and dividing said light-emitting material into plural color blocks.

14. The light emitting cell as set forth in claim 13, further comprising a reflecting layer attached to said light-emitting material and said black matrix for enhancing reflection.

15. The light emitting cell as set forth in claim 14, wherein said reflecting layer is made of aluminum.

16. The light emitting cell as set forth in claim 1, wherein said electron beam is emitted by applying an electric field to said electron beam to accelerate said electron beam.

17. The light emitting cell as set forth in claim 1, wherein said light-emitting material emits light selected from a group comprising red, green and blue.

18. A light-emitting cell, comprising:
a light-emitting material which can emit light in response to a collision of an electron beam;
an electron-emitting unit further having:
a carbon nanotube as an electron source; and
an extracting electrode disposed adjacent said carbon nanotube for controlling said electron beam emitting from said carbon nanotube and then said electron beam flowing toward said light-emitting material; and
a gate formed above said carbon nanotube and said extracting electrode for controlling said electron beam from said carbon nanotube whether to pass through said gate to ram against said light-emitting material at a specific address wherein said gate comprises a network conductor including a first metal layer of longitudinal conductors for determining an x-coordinate of said address, and a second metal layer of latitudinal conductors for determining a y-coordinate of said address, and wherein said gate further conprises an insulating layer placed between said second metal layer and said first metal layer.

19. A light-emitting cell, comprising:
a panel attached by a light-emitting material thereon, and plural black matrix disposed adjacent to said light-emitting material, and a reflecting material attached to said light-emitting material and said black matrix, wherein said light-emitting material emits light in response to a collision of an electron beam;
a substrate having a conductive layer formed thereon for forming a carbon nanotube on said conductive layer, said carbon nanotube as an electron source for releasing said electron beam to ram against said light-emitting material;
a gate disposed between said carbon nanotube and said light-emitting material for controlling said electron beam emitting from said carbon nanotube whether to pass through said gate to ram against said light-emitting material at a specific address, wherein said gate comprises a network conductor including a first metal layer of longitudinal conductors for determining an x-coordinate of said address, a second metal layer of latitudinal conductors for determining a y-coordinate of said address, a third metal layer for focusing said electron beam, and an extracting electrode disposed between said carbon nanotube and said first metal layer for extracting said electron beam from said carbon nanotube, and wherein said gate further comprises an insulating layer placed between said second metal layer and said first metal layer.

20. A light-emitting cell, comprising:
a panel attached by a light-emitting material thereon, and said light-emitting material divided as plural color blocks by plural black matrix, and a reflecting material attached to said light-emitting material and said black matrix; said light-emitting material can emit light in response to a collision of an electron beam;
a substrate further having:
a conductive line layer formed thereon for forming a carbon nanotube on said conductive line layer, said carbon nanotube as an electron source for releasing said electron beam to ram against said light-emitting material; and
an extracting electrode disposed on a dielectric layer formed on said substrate, and adjacent said carbon nanotube for controlling said electron beam emitting from said carbon nanotube and said electron beam flowing toward said light-emitting material; and
a gate formed above said carbon nanotube and said extracting electrode for controlling said electron beam from said carbon nanotube whether to pass through said gate to ram against said light-emitting material at a specific address, wherein said gate comprises a network conductor including a first metal layer of longitudinal conductors for determining an x-coordinate of said address, a second metal layer of latitudinal conductors for determining a y-coordinate of said address, and a third metal layer for focusing said electron beam, and wherein said gate further comprises an insulating layer placed between said second metal layer and said first metal layer.

21. The light emitting cell as set forth in claim 20, wherein said light is enclosed in a vacuum environment.

22. A method for emitting light, comprising steps of:
providing a light-emitting material which can emit light in response to a collision of an electron beam;
providing a carbon nanotube as an electron source for releasing said electron beam;
providing an extracting electrode adjacent to said carbon nanotube for continuously extracting said electron beam from said carbon nanotube; and
providing a gate above said carbon nanotube layer for controlling said electron beam whether to pass through said gate to ram against said light-emitting material on a specific address thereon, wherein said gate is provided a first metal layer of longitudinal conductors constructed by a plurality of longitudinal metal places for determining an x-coordinate of said address, and a second metal layer of latitudinal conductors constructed by a plurality of latitudinal metal places for determining a y-coordinate of said address, and wherein said first longitudinal metal plates have plural first apertures thereon for said electron beam passing therethrough and said latitudinal metal plates have plural second apertures thereon for said electron beam passing therethrough, and said first apertures are aligned with said second apertures.

23. The method according to claim 22, wherein said first metal layer of longitudinal conductors is constructed by a plurality of longitudinal wires, and said second metal layer of longitudinal conductors is constructed by a plurality of latitudinal wires.

24. The method according to claim 22, wherein said extracting electrode is placed above said carbon nanotube and exempted from said first metal layer by a first insulating layer, said extracting electrode has plural passing apertures for said electron beam passing therethrough.

25. The method according to claim 22, further comprising a step is to providing a third metal layer on said gate wherein said third metal layer has plural focusing apertures for said electron beam passing therethrough and focused therein as a spot on said address.

26. The method according to claim 22, wherein said carbon nanotube is formed on a conductive layer forming on a substrate, said extracting electrode is formed above said conductive layer and exempted therefrom by a dielectric material.

* * * * *